L. B. WYGANT.
BALING PRESS.
APPLICATION FILED DEC. 6, 1911.

1,065,648.

Patented June 24, 1913.

2 SHEETS—SHEET 1.

WITNESSES:
J. H. Gardner
M. L. Wilhelm

INVENTOR:
Lewis B. Wygant,
BY
E. T. Silvius,
ATTORNEY.

L. B. WYGANT.
BALING PRESS.
APPLICATION FILED DEC. 6, 1911.
1,065,648.
Patented June 24, 1913.
2 SHEETS—SHEET 2.
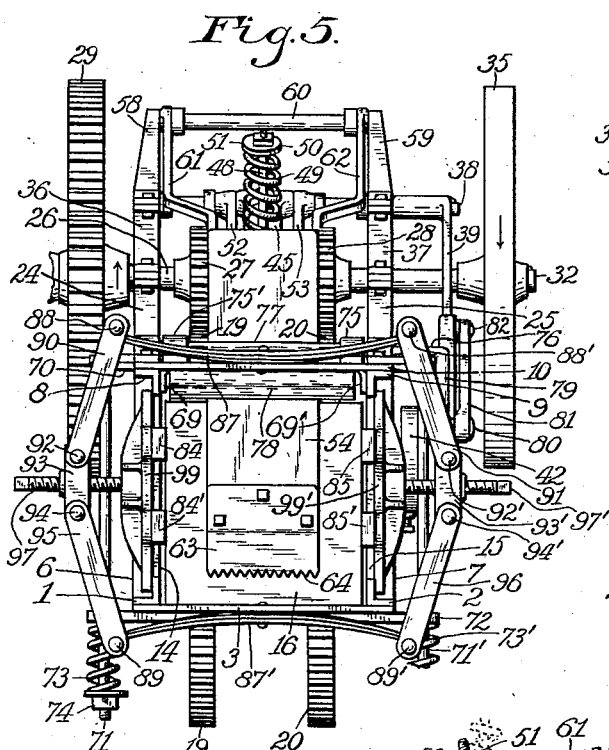
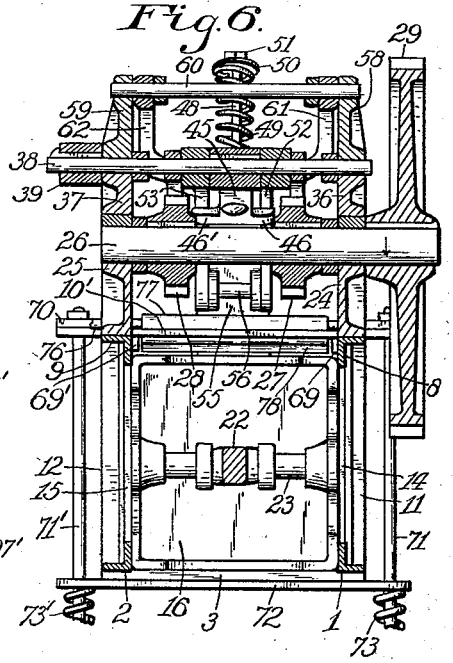
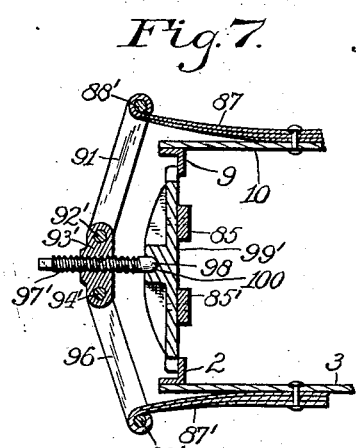
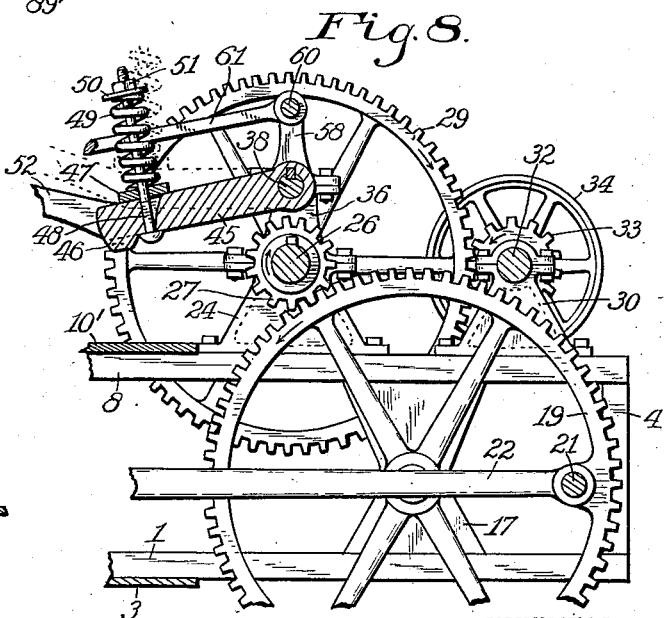
WITNESSES:
J. H. Gardner
M. L. Wilhelm
INVENTOR:
Lewis B. Wygant,
BY
E. T. Silvius,
ATTORNEY.

UNITED STATES PATENT OFFICE.

LEWIS B. WYGANT, OF VINCENNES, INDIANA.

BALING-PRESS.

1,065,648.

Specification of Letters Patent.   Patented June 24, 1913.

Application filed December 6, 1911. Serial No. 664,250.

*To all whom it may concern:*

Be it known that I, LEWIS B. WYGANT, a citizen of the United States, residing at Vincennes, in the county of Knox and State of Indiana, have invented a new and useful Baling-Press, of which the following is a specification, reference being had to the accompanying drawings and to the letters and figures of reference marked thereon.

This invention relates to power machinery for baling hay or other substance, the invention having reference more particularly to a portable machine specially adapted for forming hay into bales.

The object of the invention is to improve the details of construction of baling presses, more particularly the baling chamber, the feeder, and the driving gearing, to the end that the substance may be baled expeditiously and compactly; a further object of the invention being to provide an improved baling press that will be so constructed as to be very strong and powerful and not excessively heavy, which may be constructed principally or wholly of metal and which will be reliable, durable and economical in use.

With the above mentioned and other objects in view, the invention consists in certain novel features of construction in baling presses, and in the parts and combinations and arrangements of parts as hereinafter particularly described and pointed out in the accompanying claims.

Figure 1:
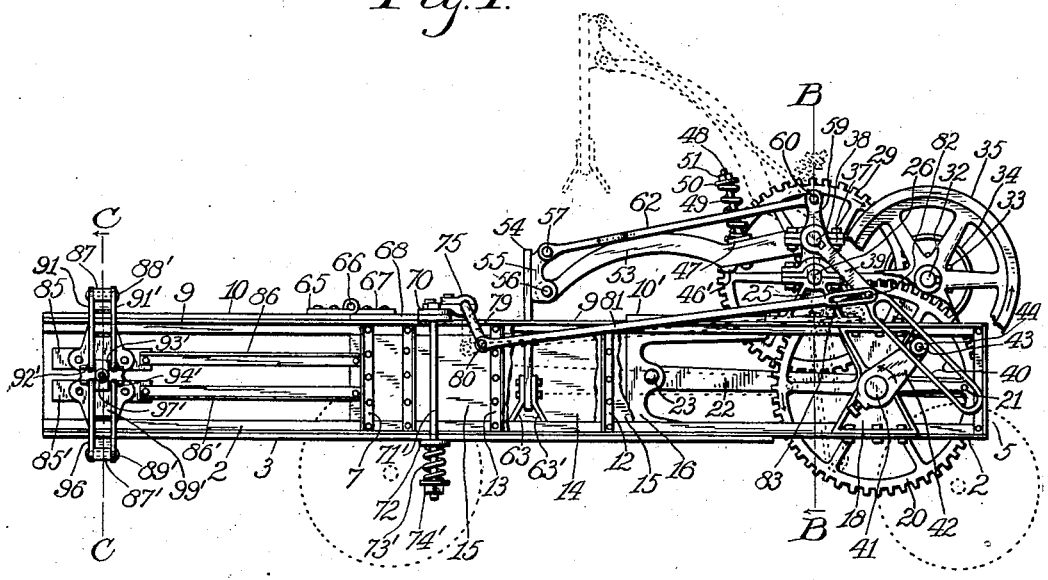
Figure 2:
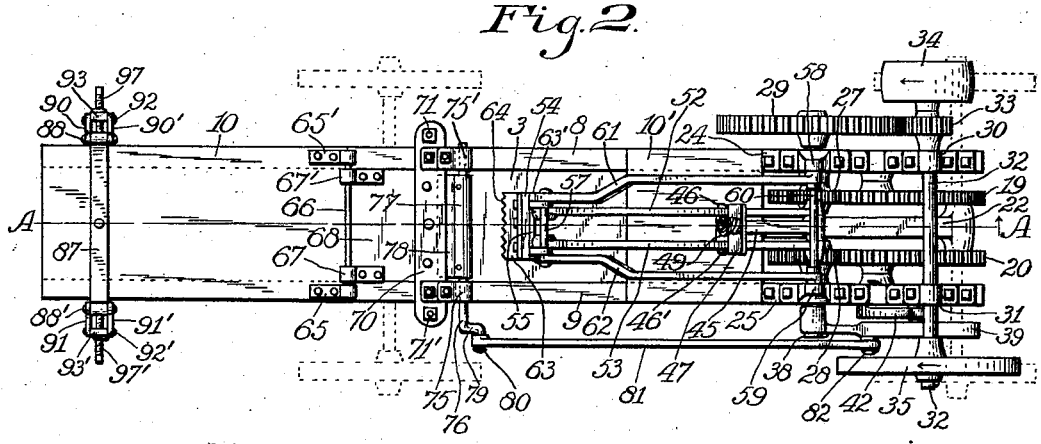
Figure 3:
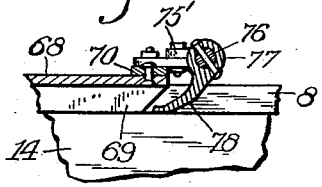
Figure 4:
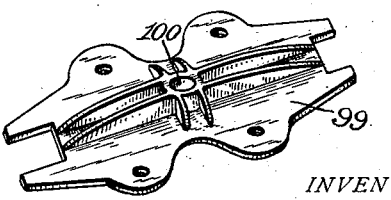

Referring to the drawings, Figure 1 is a side elevation of a baling press constructed substantially in accordance with the invention, minor parts being omitted or broken away; Fig. 2, a top plan thereof; Fig. 3, a fragmentary vertical section on the line A A in Fig. 2; Fig. 4, a perspective view of one of the parts with which the baling chamber is provided; Fig. 5, a rear end elevation of the machine; Fig. 6, a fragmentary transverse sectional view on the plane of the line B B in Fig. 1; Fig. 7, a fragmentary section on the plane of the line C C in Fig. 1; and Fig. 8, a fragmentary sectional elevation on the plane of the line A A.

Similar reference characters in the different figures of the drawings indicate corresponding elements or features of construction herein referred to and described.

Some of the parts of the structure herein referred to for descriptive purposes are well known in machines of this character or may be varied as experience may dictate.

The main frame comprises two lower longitudinal rails 1 and 2 provided with a bottom 3 which is somewhat shorter than the rails so that space is left in the forward end of the machine for gearing. Two end posts 4 and 5 are secured upon the forward ends of the lower rails, and two other posts 6 and 7 are secured upon the rails at a suitable distance from the rear ends of the rails, an upper longitudinal rail 8 being secured upon the posts 4 and 6, another upper longitudinal rail 9 being secured upon the posts 5 and 7. A top plate or board 10 is secured upon the upper rails 8 and 9 and it extends from the rear ends thereof forward a suitable distance approximately to the plane of the posts 6 and 7, another top plate or board 10′ being secured also to the upper rails at a suitable distance forward of the plate 10. Two other posts 11 and 12 are secured to the lower and upper rails at a suitable distance forward of the posts 6 and 7, being approximately at the plane of the forward end of the baling chamber, there being also a suitable number of other posts 13 secured to the lower and upper rails intermediately of the plane of the posts 6 and 7 and the plane of the posts 11 and 12, the baling chamber having side walls 14 and 15 as is customary. A rammer 16 is suitably guided in the baling chamber for pressing hay or other substance into compact form. A shaft-bearing 17 is secured to the rails 1 and 8, and a companion shaft-bearing 18 is secured to the rails 2 and 9 and respectively support two gear wheels 19 and 20 which are connected together by a crank pin 21 to which a pitman 22 is connected, the pitman being connected to the rammer by means of a wrist pin 23. Two shaft-bearings 24 and 25 are secured upon the upper rails 8 and 9 respectively and rotatably support a shaft 26 slightly rearward of the vertical plane in which the axes of the wheels 19 and 20 are arranged, the wheels 19 and 20 being in mesh and driven by two pinions 27 and 28 respectively that are secured to the shaft 26. The shaft 26 is of suitable length and has a large gear wheel 29 secured to one end portion thereof. Two shaft-bearings 30 and 31 are secured upon the forward end portions of the upper rails 8 and 9 and rotatably support a driving shaft 32 which has a pinion 33 secured thereto that is in mesh with the wheel 29. Power may be applied to the shaft 32 by any desired means, the shaft preferably having a pulley 34 secured thereto to be driven by a belt, and preferably a fly wheel 35 is secured to the driving shaft. Two shaft-bearings 36 and 37 are suitably supported, preferably upon the shaft-bearings 24 and 25 and they support a rock-shaft 38 preferably above the shaft 26. An arm 39 is suitably connected to one end portion of the rock-shaft so that the rock-shaft may be operated by the arm, the connection between the arm and the rock-shaft preferably being rigid. The arm has a longitudinal slot 40 therein, and the axial shaft 41 of the wheel 20 has an arm 42 adjustably secured thereto that is provided with a crank pin 43 extending into the slot and preferably provided with a roller 44.

A feeder is mounted on the rock-shaft to be moved up or down by means of the operating-arm 39 with suitable yielding connections between the operating-arm and the feeder. In the preferred form of construction a rocker arm 45 is secured to the rock-shaft 38 and is provided with two oppositely extending lateral lugs 46 and 46' that are at the under side thereof. A cross-bar 47 is placed upon and extends across the upper side of the rocker arm. A lug bolt 48 is securely connected with the rocker arm and extends upward through the cross-bar and also through a coil spring 49 that is seated upon the cross-bar, a washer 50 being placed upon the upper end of the spring and held in place by a nut 51 screwed onto the lug bolt and whereby the tension of the spring may be adjusted. Two feeder arms 52 and 53 are rotatably mounted on the rock-shaft 38 at opposite sides of the rocker arm 45 and normally rest upon the lugs 46 and 46' in contact with the under side of the cross-bar 47, so that the feeder arms may move away from the lugs and carry the cross-bar away from the rocker arm. A feeder head 54 is employed which has a pivot head 55 on the upper portion thereof which is provided with two pivots 56 and 57, the pivot 57 being connected with the ends of the feeder arms 52 and 53. The feeder arms are of suitable length so as to carry the feeder head up or down rearwardly of the rammer 16 when the latter is in its forward or retracted position. Two posts 58 and 59 are suitably supported upon the frame of the machine, preferably upon the shaft-bearings 36 and 37 respectively, and they support a pivot rod 60 to which two rods 61 and 62 are connected, the rods being connected also to the pivot 57, the pivot rod 60 being arranged above the rock-shaft 38. The pivot 57 being above the pivot 56 it will be seen that as the feeder head 54 is moved up or down it is maintained in substantially vertical position by means of the rods, and by thus operating, the feeder head is freely withdrawn away from the hay after packing the hay down in the baling chamber without dragging particles of the hay out with it. Preferably the feeder head 54 has two diverging wings 63 and 63' on its lower end, each wing preferably having blunt teeth 64 on its lower edge.

A pair of hinge members 65 and 65' are secured upon the forward portion of the top plate 10 and support a hinge rod 66 to which two hinge members 67 and 67' are connected, the latter members being secured to a novel top plate 68 that has downwardly extending side flanges 69 and 69' at the inner sides of the upper rails 8 and 9 respectively, to prevent the hay from being forced out over the upper rails when the plate 68 is elevated. The plate 68 is of suitable length to partially cover the baling chamber, leaving space between its forward end and the rear end of the top plate 10' to receive the hay into the baling chamber. The forward end of the hinged top plate 68 is provided with a cross-bar 70 with which two tension rods 71 and 71' are connected, the rods extending through a cross-bar 72 placed beneath the bottom 3. Two springs 73 and 73' are supported on adjusting nuts 74 and 74' screwed onto the tension rods, the springs being in contact with the under side of the cross-bar 72 so as to resist upward movement of the top plate 68 to the desired degree. The forward end of the hinged plate 68 is provided also with two journal boxes 75 and 75' in which a rock-shaft 76 is mounted and provided with a tucker wing which comprises a cylindrical base portion 77, and a guide plate 78 normally extending downward from the base portion and curved rearwardly, so as to guide the hay in its passage into the baling chamber and preventing the hay from catching or being caught against the forward end of the plate 68, the wing being moved in operation so as to tuck in the straggling particles of hay, as will be understood. The rock-shaft 76 has a crank arm 79 thereon provided with a crank pin 80 to which an operating-rod 81 is connected, the operating-rod being connected also to a wrist pin 82 with which the operating-arm 39 is provided, the operating-rod 81 having a slot 83 therein in which the wrist pin 82 may move during portions of the stroke of the operating-arm 39 while the tucker remains at rest.

The rear end portion of the baling chamber is expansible, and the rear end portions of the bottom 3 and top plate 10 may be left free to be forced away from the longitudinal rails, the upright sides of the delivery end portion of the baling chamber being slatted as is customary and preferably comprise horizontal bars 84 and 84' for one side and similar bars 85 and 85′ for the opposite side, the bars being connected to slats 86 and 86′ that extend to the posts 6 and 7. A semi-elliptic spring 87 is mounted upon the top plate 10 and a similar spring 87′ is connected in reverse arrangement to the under side of the bottom 3, the ends of the spring 87 being provided with pivots 88 and 88′, the spring 87′ being likewise provided with pivots 89 and 89′. A pair of links 90 and 90′ are connected to the pivot 88 and similar links 91 and 91′ are connected to the pivot 88′. The links 90 and 90′ are connected to a pivot 92 and the links 91 and 91′ are connected to a pivot 92′, a crosshead 93 being connected to the pivot 92, a similar crosshead 93′ being connected to the pivot 92′, the crossheads having pivots 94 and 94′ connected thereto respectively to which links 95 and 96 are connected respectively, the links being connected also to the pivots 89 and 89′ respectively. The crossheads are provided with adjusting screws 97 and 97′ respectively, each screw having a rounded end 98. A press plate 99 is secured to the bars 84 and 84′ and a similar plate 99′ is secured to the bars 85 and 85′, each press plate having a socket 100 therein receiving the rounded end 98 of the adjusting screws. It will be understood that the tension of the springs force the presser plates against the outer sides of the longitudinal rails of the frame and that the presser plates may be forced outwardly by the bales as they are forced out of the delivery end of the baling chamber. It will be understood also that if the bale is more dense in vertical direction than in horizontal direction it may force the bottom 3 and top 10 slightly apart so as to reduce the frictional resistance of the bale in its movement. If it be desired to increase the frictional resistance in order to more compactly compress the hay the screws 97 and 97′ may be readjusted so as to increase the tension of the springs 87 and 87′.

In practical use the hay or other substance is placed by an attendant into the opening in the top of the baling chamber while the rammer and the feeder head are in retracted position, and while the rammer is in retracted position the feeder head moves downward and forces the substance into the baling chamber and is then withdrawn while the rammer is moving into the chamber to compress the substance, suitable division blocks being employed as will be understood. While the rammer is advancing and the operating-arm 39 is moved rearward to withdraw the feeder head, the wrist pin 82 travels in the slot 83 until it arrives at the opposite end of the slot, and then during the remainder of the stroke of the operating-arm the operating-rod 81 is forced rearward so as to move the wing 78 from a downwardly extending position to a rearwardly extending position and permit the hay to pass freely under the wing. If excessive pressure occurs, it will be understood that the hinged top plate 68 is slightly forced upward so as to more freely receive the hay under it. When the rammer is again retracted it is evident that the operating-arm 39 after moving some distance carries the wrist pin 82 to the forward end of the slot 83 and moves the wing 78 again to downwardly extending position.

Having thus described the invention, what is claimed as new is—

1. A baling press including a frame having a chamber therein, a feeder mounted on the frame and having a head that is movable into or out of the chamber, the feeder being provided with an operating-arm, a supported tucker movable in the chamber, and an operating-rod connected with the tucker and the operating-arm.

2. A baling press including a frame, a rock-shaft rotatably mounted on the frame, a pivot rod supported by the frame above the rock-shaft, two feeder arms spaced apart and pivotally mounted on the rock-shaft, a feeder head pivotally connected to the two feeder arms, two rods spaced apart a greater distance than the two feeder arms and connected to the pivot rod and also pivotally connected to the feeder head, and means connected with the rock-shaft and the two feeder arms between the rods for moving the arms up or down and permitting the rock-shaft to rotate relative to the arms on downward movement of the arms.

3. A baling press including a frame having a chamber therein, a rock-shaft rotatably mounted on the frame, a pivot-rod supported by the frame above the rock-shaft, a rocker-arm fixedly connected to the rock-shaft, a feeder-arm pivotally connected to the rock-shaft and normally resting on the rocker-arm, a feeder-head pivotally connected to the feeder-arm and movable thereby into or out of the chamber, a rod connected to the pivot-rod and also pivotally connected to the feeder-head, and yielding connections between the rocker-arm and the feeder-arm enabling the rocker-arm to move relative to and yieldingly force the feeder-arm downward.

4. In a baling press, the combination of a frame, a top plate hinged to the frame and spring-pressed thereto, a tucker movably mounted on the plate and provided with an operating-rod, and a feeder movably mounted on the frame and provided with an operating-arm that is connected with the operating-rod.

5. In a baling press, the combination of a frame having a chamber therein, the frame having a hinged top plate thereon partially covering the chamber, said plate having downward extending side flanges at the sides of the chamber, tension springs coöperating with the frame to yieldingly hold said plate down upon the frame, and a tucker mounted on the movable end of said plate.

6. In a baling press, the combination of a frame having a chamber therein, the frame having a top plate partially covering the chamber, a rock-shaft mounted on the edge of the plate and having a crank-arm thereon, a tucker wing having a cylindrical base portion that is secured to the rock-shaft, an operating-rod connected to the crank-arm, a rock-shaft mounted on the frame and provided with an operating-arm that is connected with the operating-rod, and a feeder mounted on the last-described rock-shaft and operated thereby.

7. In a baling press, the combination of a frame having a fixed top plate, a top plate section hinged to the fixed top plate and having flanges on opposite sides thereof extending downward into the frame, a cross-bar secured upon the movable end of said plate section and extending across the top of the frame, a tucker mounted on the free end of said hinged top plate section at said cross-bar, a stationary cross-bar beneath the frame, two tension-rods connected to the cross-bar that is secured to said plate and extending downward through the stationary cross-bar, adjusting nuts on the lower ends of said tension-rods, and two springs between said nuts respectively and the stationary cross-bar.

8. In a baling press, the combination of a frame having a bottom and also a top plate, a plate-spring seated upon the top plate and extending beyond the sides thereof, links pivotally connected to opposite ends of the spring, two cross-heads pivoted to the links respectively, links pivotally connected to the two cross-heads respectively, a plate spring seated against the under side of said bottom and connected at its ends to the last-described links, two adjusting-screws mounted in the two cross-heads respectively, two press plates having sockets receiving adjacent ends of the adjusting-screws respectively, and bars connected respectively to the press plates and the frame.

9. In a baling press, the combination with a frame having an open-top chamber therein, a rock-shaft rotatably supported on the frame and having a rocker-arm fixed thereon, the rocker-arm being provided with two lugs, two feeder-arms pivotally connected to the rock-shaft on opposite sides of the rocker-arm and normally resting upon the two lugs respectively, a cross-bar normally seated upon said feeder-arms, a spring seated upon said cross-bar, a lug-bolt connected to said rocker-arm and extending through said cross-bar and said spring, a nut on said lug-bolt for compressing said spring, an operating-arm secured to said rock-shaft, and a feeder head connected to said two feeder-arms.

10. In a baling press, the combination of a frame having an open-top chamber therein, a shaft rotatably supported by the frame, a pinion secured to the shaft, a rock-shaft supported by the frame, an operating-arm secured to the rock-shaft and having a longitudinal slot therein, a gear wheel rotatably mounted in the frame in mesh with said pinion and provided with an adjustable crank-arm, said crank-arm having a crank-pin thereon extending movably into said slot, a rocker-arm secured to said rock-shaft and having two lugs on the under side thereof, two feeder-arms rotatively mounted on said rock-shaft and normally resting upon said lugs, a feeder-head mounted on said feeder-arms to be carried thereby into or out of said chamber, a cross-bar normally seated upon said rocker-arm and said feeder-arms, a spring seated upon said cross-bar, a lug-bolt connected to said rocker-arm and extending through said cross-bar and said spring, a washer on said spring, and a nut on said washer and connected to said lug-bolt.

11. In a baling press, the combination of two longitudinal top rails, two longitudinal bottom rails, a top plate secured upon the top rails, a bottom plate secured to the under side of the bottom rails, two press plates removably seated against the outer sides of the top rails and also against the outer sides of the bottom rails respectively, a spring element having support on the upper side of the top plate, two links connected with the spring element, two crossheads connected with the two links and also with the two press plates respectively, two other links connected to the two crossheads respectively and also with the bottom plate, and bars connected to the two press plates respectively.

In testimony whereof, I affix my signature in presence of two witnesses.

LEWIS B. WYGANT.

Witnesses:
   EARLE L. CHAMBERLAIN,
   NINA BRADLEY.

---

Copies of this patent may be obtained for five cents each, by addressing the "Commissioner of Patents Washington, D. C."